United States Patent [19]
Okamoto et al.

[11] Patent Number: 5,780,180
[45] Date of Patent: Jul. 14, 1998

[54] SEALED ALKALINE STORAGE BATTERY

[75] Inventors: Miho Okamoto, Sakai; Shinji Hamada, Hirakata; Munehisa Ikoma, Shiki, all of Japan

[73] Assignee: Matsushita Electric Industrial Co., Ltd., Osaka-fu, Japan

[21] Appl. No.: 735,577

[22] Filed: Oct. 23, 1996

[30] Foreign Application Priority Data

Oct. 24, 1995 [JP] Japan ................................. 7-275332

[51] Int. Cl.$^6$ .................................................. H01M 2/04
[52] U.S. Cl. ......................................... 429/175; 429/176
[58] Field of Search ................................. 429/175, 176

[56] References Cited

U.S. PATENT DOCUMENTS 4,460,663  7/1984  Stutzbach et al. ................. 429/175 X
5,053,296  10/1991  Stocchiero ............................ 429/175
5,478,878  12/1995  Nagaoka et al. ..................... 524/430

Primary Examiner—Stephen Kalafut
Attorney, Agent, or Firm—Panitch Schwarze Jacobs & Nadel, P.C.

[57] ABSTRACT

The present invention provides a sealed alkaline storage battery comprising a container of polymer alloy mainly comprised of PPE and an olefin resin and containing PPE of 20–60 wt %, or a composite material of polymer alloy containing PPE and an inorganic powder of 5–50 wt %. Using this material as a container, it is possible to restrict decrease in an amount of electrolyte thereby providing a sealed alkaline storage battery having a long life, which is possible to guarantee a maintenance-free long life of 7–10 years.

11 Claims, 10 Drawing Sheets

SEALED ALKALINE STORAGE BATTERY

FIELD OF THE INVENTION

The present invention relates to a middle sized sealed alkaline storage battery used as a power source for a movable body such as an electric vehicle, especially relates to a material for a container including a battery case and a lid thereof.

BACKGROUND OF THE INVENTION

As one of global environmental problems, an exhaust gas of an automobile has been attracting considerable attention in these days. To cope with this problem, an electric vehicle has been developed eagerly. The development of a power source for the electric vehicle is key to the development of the electric vehicle.

As the power source for the electric vehicle, lead-acid storage batteries have been developed. An ordinary open-type lead-acid storage battery, however, has a disadvantage that it must be supplied with an electrolyte once a year or so. Whereas, an ordinary sealed-type lead-acid storage battery does not require such electrolyte supply, but has a short life of about 1–3 years and a low energy density.

On the other hand, an alkaline storage battery such as a nickel-cadmium storage battery or a nickel-metal hydride storage battery has a higher energy density and a longer life than the lead-acid storage battery. Therefore, the alkaline storage battery is developed eagerly from the aspect of increasing the capacity thereof in these days. Especially, a sealed-type alkaline storage battery is developed eagerly because this type of battery has high safety due to no discharge of gas outside the battery system, and easy maintenance due to no need of electrolyte supply.

A conventional container for the sealed alkaline storage battery is made of a synthetic resin mainly comprised of an olefin resin represented by polypropylene, or a polymer alloy mainly made of polyphenylene ether and polystyrene, and formed almost into quadrangular shape by injection molding.

In the case that the synthetic resin mainly comprised of the olefin resin is applied to a material for the container, there are be low-mentioned disadvantages:

(1) On a sealed alkaline storage battery, a safety valve is equipped in order to prevent the battery from breaking due to an abnormally increased inner pressure of the battery. A working pressure of the safety valve is adjusted within 6–8 kgf/cm$^2$. The inner pressure of the battery rises to about 2–4 kgf/cm$^2$ in maximum in a charging step. Furthermore, if the sealed alkaline storage battery is used in a charged state for a long time, for example, outdoors at a high temperature, the container of the battery continuously receives an inner pressure of 1–5 kgf/cm$^2$. Under such a severe circumstance, the battery can not maintain a long-term stability, since the container may be broken due to creep deformation.

(2) Since the olefin resin has a low mechanical strength, a thickness of the container must be relatively thick, in consideration of mechanical fatigue. But a thicker container leads to decreases in volume of the container and energy density of the battery.

(3) An alkaline storage battery is composed of plural positive electrodes mainly made of nickel hydroxide, plural negative electrodes mainly made of a hydrogen storage alloy or cadmium hydroxide, and an aqueous alkaline electrolyte, which are placed in a container. Ordinarily, the olefin resin has a disadvantage that a corrosion is accelerated by metal ions. Therefore, it is difficult to obtain a long-term reliability of the battery.

In the case that a polymer alloy mainly made of polyphenylene ether and polystyrene is applied as a material for a container for the alkaline storage battery, there are below-mentioned disadvantages:

(1) In the case that the polymer alloy is applied as a material for the container, since the polymer alloy has a high moisture permeability, an electrolyte decreases easily because a moisture in the electrolyte passes through the container toward outside and is lost. Therefore, the battery is low in performance, especially in life.

(2) Polyphenylene is low in durability against chemicals such as a machine oil or an organic solvent and easily causes cracks thereon. Therefore, the battery is low in long-term stability.

SUMMARY OF THE INVENTION

An object of the present invention is to solve the above-mentioned problems and provide a sealed alkaline storage battery having a long life, which is possible to guarantee a maintenance-free long life of 7–10 years.

The present invention provides a sealed alkaline storage battery comprising:

an electrode group comprising positive electrodes and negative electrodes which are piled alternately and separators sandwiched therebetween;

a battery case containing the electrode group therein; and a lid for sealing an opening portion of the battery case, wherein the battery case or the lid is made of a polymer alloy containing polyphenylene ether and an olefin resin as main components, the olefin resin occupying 20–60 wt % of the whole polymer alloy.

Furthermore, the present invention provides a sealed alkaline storage battery comprising:

an electrode group comprising positive electrodes and negative electrodes which are piled alternately and separators sandwiched therebetween;

a battery case containing the electrode group therein; and a lid for sealing an opening portion of the battery case, wherein the battery case or the lid is made of a composite material of polymer alloy mainly comprised of polyphenylene ether, and an inorganic powder dispersed in the polymer alloy.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE PREFERRED EMBODIMENTS

The embodiments of the present invention will now be described in detail with reference to the drawings.

Figure 1:
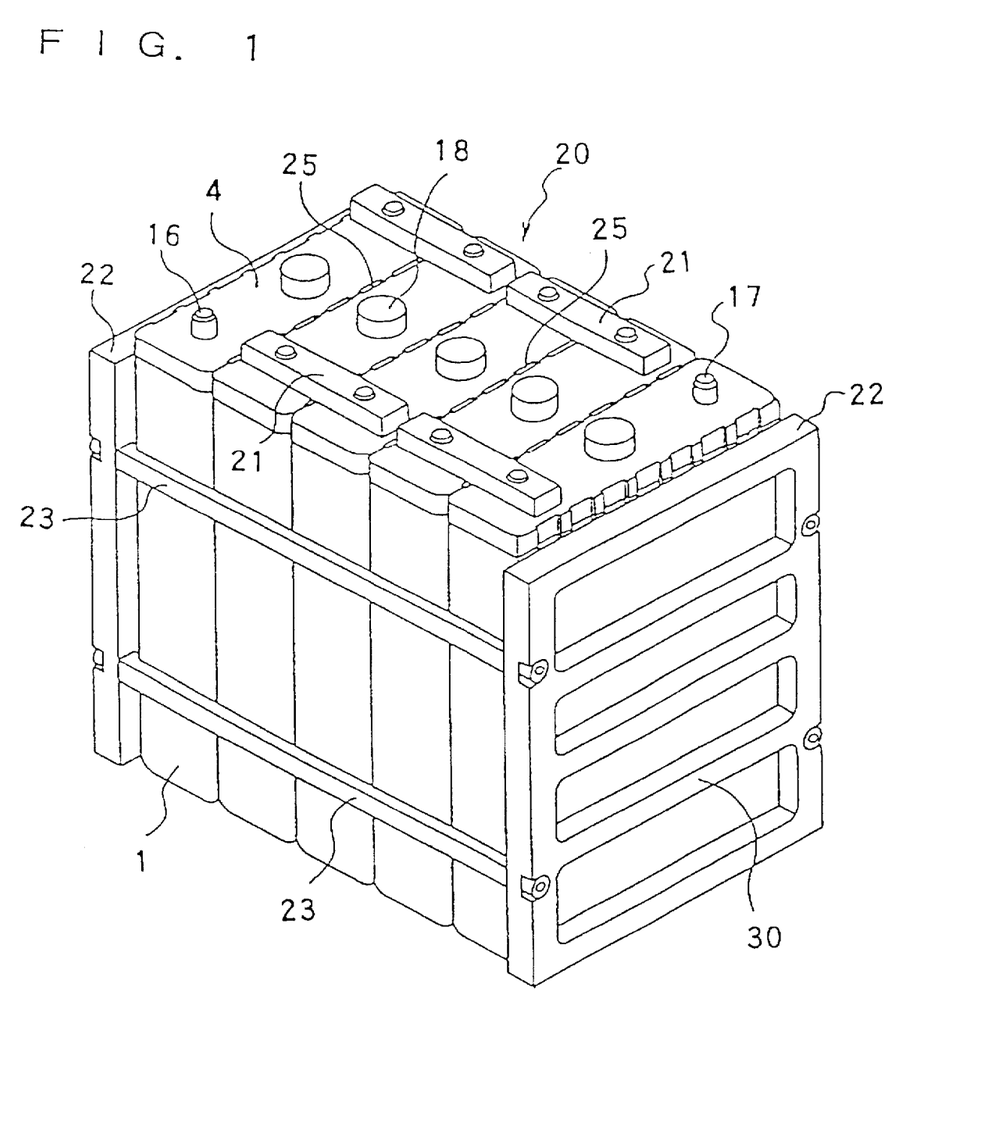
FIG. 1 shows a perspective view of a module battery used in one embodiment in accordance with the present invention.
Figure 2:
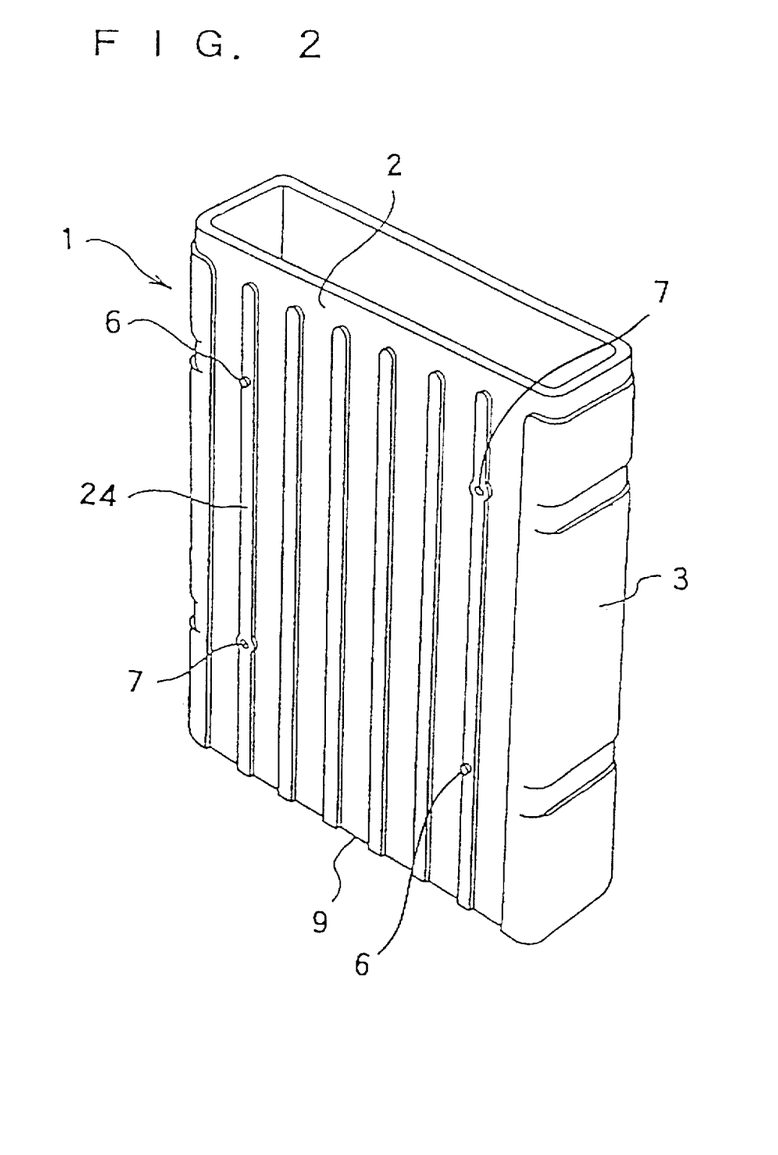
FIG. 2 shows an upward perspective view of a battery case used in the embodiment.
Figure 3:
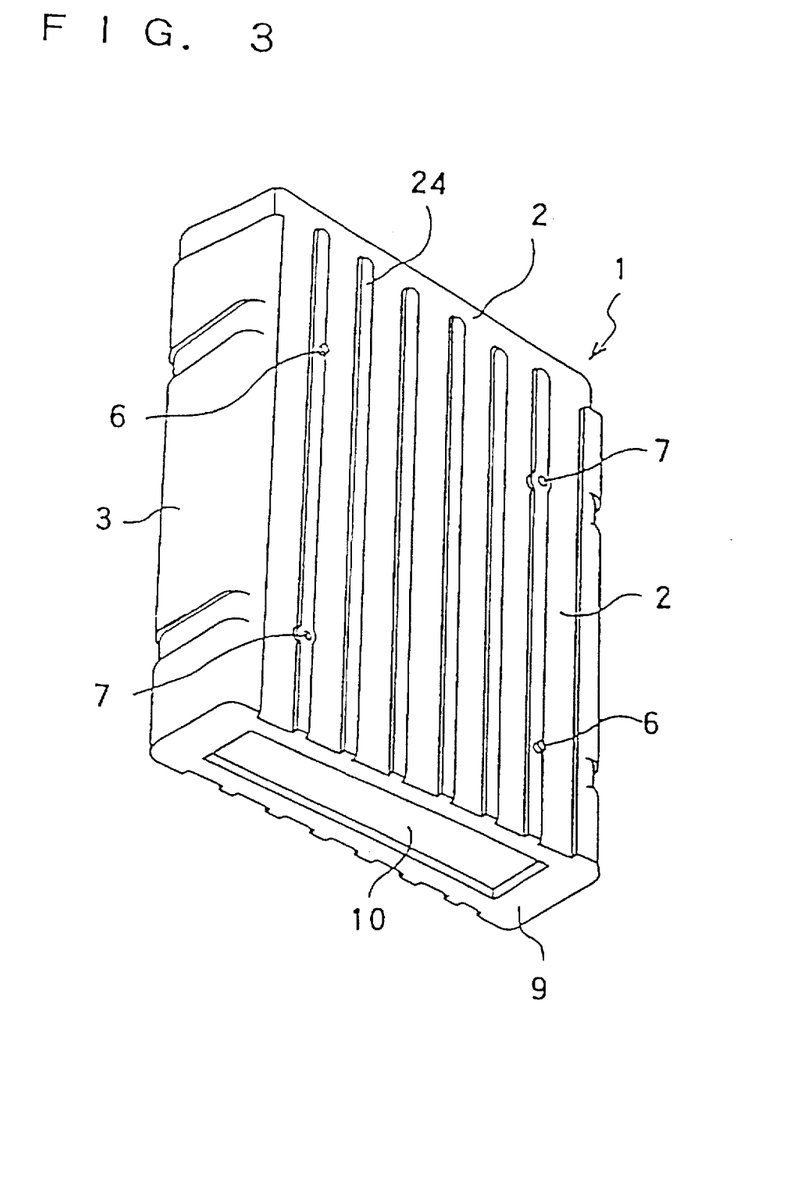
FIG. 3 shows a downward perspective view of the battery case in the same embodiment.

FIG. 1 shows a module battery used in this embodiment. The module battery 20 consists of five cells 4 connected in series. With reference to FIG. 1, FIG. 2 and FIG. 3, contiguous cells 4 are mutually positioned by butting ribs 24 of the battery case 1 each other, and fitting protrusions 6 into recesses 7 of the other cell 4. Further, a positive terminal 16 of one cell 4 and a negative terminal 17 of the contiguous cell 4 are connected to each other by a connecting conductor 21.

The module battery 20 has a structure in which aluminum end plates 22 are disposed on the side faces of the stuck of the five cells 4 connected in series as described above. The end plates 22 are coupled to each other by four rod-shaped binding members 23, whereby the cells are tightly fixed to each other and would not separate from each other by expansion of the electrode group 11 or an increased internal pressure of the cells 4. The dimensions of the end plates 22 and the binding members 23 are determined according to an expansion force of the electrode group 11, internal pressure of the cell 4 and the number of the stacked cells 4. In the embodiment described below, the end plates 22 are made of stainless steel and have a flat portion which has a thickness of 3 mm and the ribs 30 which have a height of 8 mm. The binding members 23 are also made of stainless steel and have a rectangular section of 7 mm×8 mm.

Figure 4:
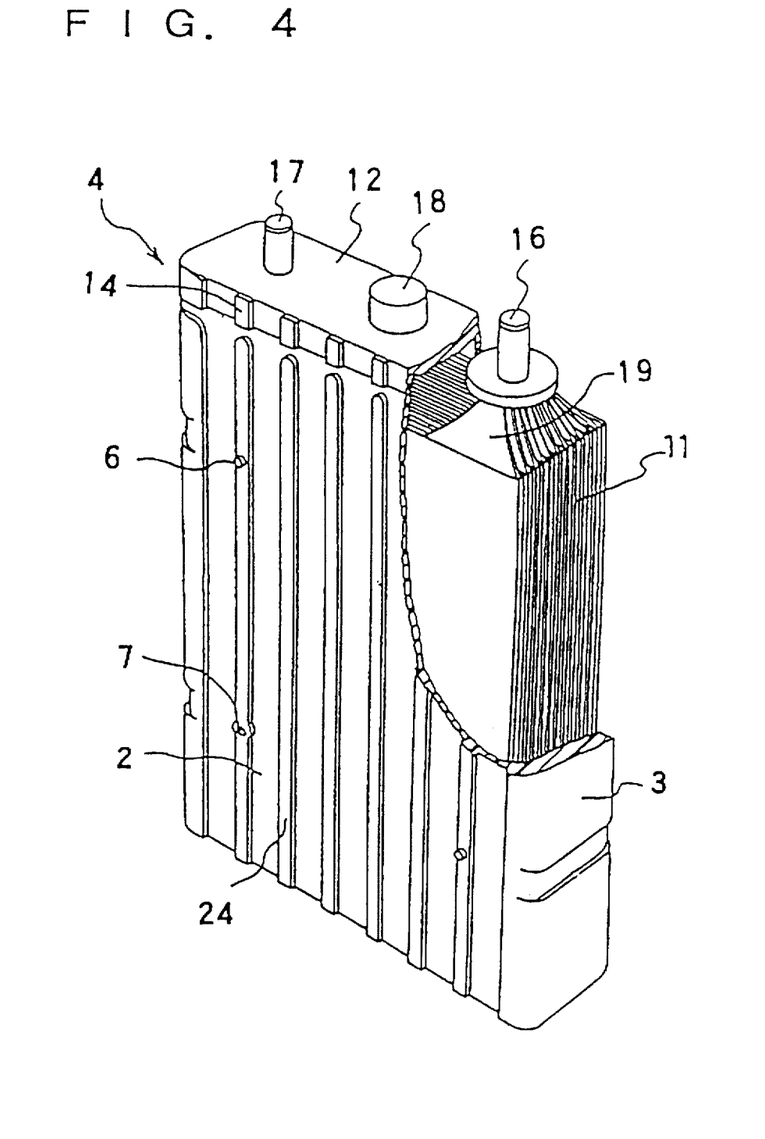
FIG. 4 shows a partially cut-away perspective view of a cell of a sealed alkaline storage battery in the embodiment.

In the module battery 20 as described above, vertically oblong spaces 25 are formed between the cells 4. Similarly, spaces are formed between the outermost cell 4 and the end plate 22 on each side. FIG. 2, FIG. 3 and FIG. 4 show perspective views of the battery case 1 used in this embodiment. The battery case 1 has a quadrangular shape of 35 mm length, 120 mm width and 160 mm height, and is composed of a pair of wider side walls 2, a pair of narrower side walls 3 and a bottom wall 9. A thickness of the walls 2, 3 and 9 are all 2 mm. On an outer face of the wider side walls 2, longitudinal ribs 24, which are to be closely butted to the corresponding ribs 24 of the oppositely disposed cell 4, are formed at regular intervals in a parallel manner.

Two recesses 8 for positioning the binding members 23 in a step of assembling the cells 4 in the module battery are formed on an outer face of the narrower side walls 3. The bottom wall 9 has a recess 10 at the central portion of the outer face.

On an opening positioned at upper portion of the battery case 1, a lid 12 of a synthetic resin which has a thickness of 2 mm has been fixed by heat-welding. A mechanical strength at the fixed portion is set to be not less than 95% of a base material. For closely abutting the cells 4, an externally protruded portion formed by welding has been removed away by grinding. The lid 12 has ribs 14 corresponding to the ribs 24 of the battery case 1 on the wider side walls 2.

EXAMPLE 1

(Influence on Moisture Permeability)

Using the below-mentioned materials No. 1–6, six kinds of battery case 1 and lid 12 were produced by injection molding.

1. polypropylene (hereinafter referred to as 'PP')
2. a polymer alloy obtained by blending polyphenylene (hereinafter referred to as 'PPE') and PP in a weight ratio of 40:60, and further adding a preferred amount of a compatibilizer
3. a polymer alloy obtained by blending PPE and polystyrene (hereinafter referred as 'PS') in a weight ratio of 40:60
4. a composite material of the above polymer alloy (No. 3) and a scaly kaoline in a ratio of 3 wt % to the polymer alloy
5. a composite material of the above polymer alloy (No. 3) and the scaly kaoline in a ratio of 20 wt % to the polymer alloy
6. a composite material of the above polymer alloy (No. 3) and the scaly kaoline in a ratio of 50 wt % to the polymer alloy The scaly kaoline used in the above materials No. 1–6 was obtained by baking a refined clay. Constituents of the scaly kaoline are shown in Table 1.

TABLE 1

| constituent | wt % |
| --- | --- |
| $SiO_2$ | 46.0 |
| $Al_2O_3$ | 38.0 |
| $Fe_2O_3$ | 0.58 |
| $TiO_2$ | 0.60 |
| MgO | 0.10 |
| $K_2O$ | 0.14 |
| $Na_2O$ | 0.13 |
| L.O.I. | 14.0 |

400 cm$^3$ of an electrolyte was poured in the thus obtained battery case 1, and then the lid 12 made of the same material as that of the battery case 1 was adhered to an upper opening of the battery case 1 by heat-welding. The container of the battery case 1 and the lid 12 was preserved at 45° C. or 80° C. An amount of a moisture escaping through the container toward outside during the preservation was measured by weighing the container before and after the preservation. The results are shown in Table 2.

TABLE 2

| | moisture permeability [g · cm/cm$^2$ · sec · cmHg] | |
| --- | --- | --- |
| kind of material for battery case and lid | at 45° C. | at 80° C. |
| 1. polypropylene | $6.8 \times 10^{-12}$ | $8.3 \times 10^{-12}$ |
| 2. polymer alloy of PPE and PP | — | $8.7 \times 10^{-11}$ | $2.7 \times 10^{-11}$ |
| 3. polymer alloy of PPE and PS | $7.6 \times 10^{-11}$ | $8.8 \times 10^{-11}$ |
| 4. polymer alloy of PPE and PS | $5.3 \times 10^{-11}$ | $7.6 \times 10^{-11}$ |

TABLE 2-continued

| kind of material for battery case and lid | moisture permeability [g · cm/cm² · sec · cmHg] | |
|---|---|---|
| | at 45° C. | at 80° C. |
| containing kaoline 3 wt % | | |
| 5. polymer alloy of PPE and PS containing kaoline 20 wt % | $2.9 \times 10^{-11}$ | $2.9 \times 10^{-11}$ |
| 6. polymer alloy of PPE and PS containing kaoline 50 wt % | $2.3 \times 10^{-11}$ | $2.1 \times 10^{-11}$ |

From a comparison between the materials No. 1, 2 and 3, all of which contained no scaly kaoline, No. 1 (PP) has the minimal moisture permeability, followed by No. 2 (polymer alloy of PPE and PP) and No. 3 (polymer alloy of PPE and PS) has the maximal permeability. From a comparison between the materials No. 3, 4, 5 and 6, it is apparent that the moisture permeability is lowered with the increase in adding amount of scaly kaoline.

The PPE plus PS polymer alloy containing 3 wt % scaly kaoline (No. 4) shows an equivalent moisture permeability to that of the same polymer alloy not containing the scaly kaoline. As is apparent from these results, a content of the scaly kaoline of less than 5 wt % was not effective for reducing the amount of the moisture escaping toward outside. On the other hand, a content of the scaly kaoline of higher than 60 wt % resulted in a low moisture permeability, but it caused a breakage of the container at an inner pressure of 4 kgf/cm² due to decreased shock resistance. Therefore, the preferred content of the scaly kaoline is 5–50 wt %.

EXAMPLE 2

(Influence on Charge/Discharge Cycle)

Using four kinds of the battery case 1 and the lid 12 made of the materials No. 1–4 produced in Example 1, sealed nickel-metal hydride storage batteries were assembled.

A foamed nickel plate was filled with an active material mainly comprised of powdered nickel hydroxide and then cut into a predetermined shape to obtain a positive electrode having a capacity of 8 Ah.

On the other hand, a punching metal sheet was coated with a powdered hydrogen storage alloy having a composition of $MmNi_{3.6}Co_{0.7}Mn_{0.4}Al_{0.4}$ (Mm: misch metal) using a binder and then cut into a predetermined shape to obtain a negative electrode having a capacity of 12 Ah.

The thus obtained positive electrodes and negative electrodes were wrapped in a bag-shaped separators respectively, and then piled together alternately to form an electrode group 11. A lead member 19 of the positive electrode was connected to a positive terminal 16 and similarly a lead member (not shown) of the negative electrode was connected to a negative terminal 17. The electrode group 11 was inserted in the battery case 1, and then 170 cm³ of an aqueous solution of potassium hydroxide having a concentration of 27 wt % was poured into the battery case 1 as an electrolyte. The amount of the electrolyte was determined in consideration of charge/discharge characteristics or an inner pressure of the battery in charging process. Then, the lid 12 was heat-welded to the upper opening of the battery case 1 in order to isolate the inside and outside of the container, thereby forming a cell 4 shown in FIG. 4.

A positive terminal 16, a negative terminal 17 of nickel plated steel and a safety valve 18 are fixed on the lid 12. The safety valve 18 was fixed on the lid 12 by heat-welding. Strength at the fixed portion is set to be not less than 95% of the base material. Working pressure of the safety valve is adjusted to be 6–8 kgf/cm².

The positive terminal 16 and the negative terminal 17 are connected to a lead member of the positive electrode and negative electrode respectively at the downward extending portion. And the upper portions of the positive terminal 16 and the negative terminal 17 are fixed on the lid 12 in liquid and air tight fashion.

Initial charge and discharge were conducted on the thus obtained cell 4. The initial charge was conducted at 25° C. for 15 hours at a current of 10 A. And then, the initial discharge was conducted at a current of 20 A until the terminal voltage was dropped to 1.0 V. During the initial charge and discharge, the electrode group 11 in the battery case 1 expands and adheres closely to the wider side walls 2 of the battery case 1. The discharge capacity in the initial discharge was 100 Ah. Hereafter this value is referred to as "standard capacity" in the discussion below.

Figure 5:
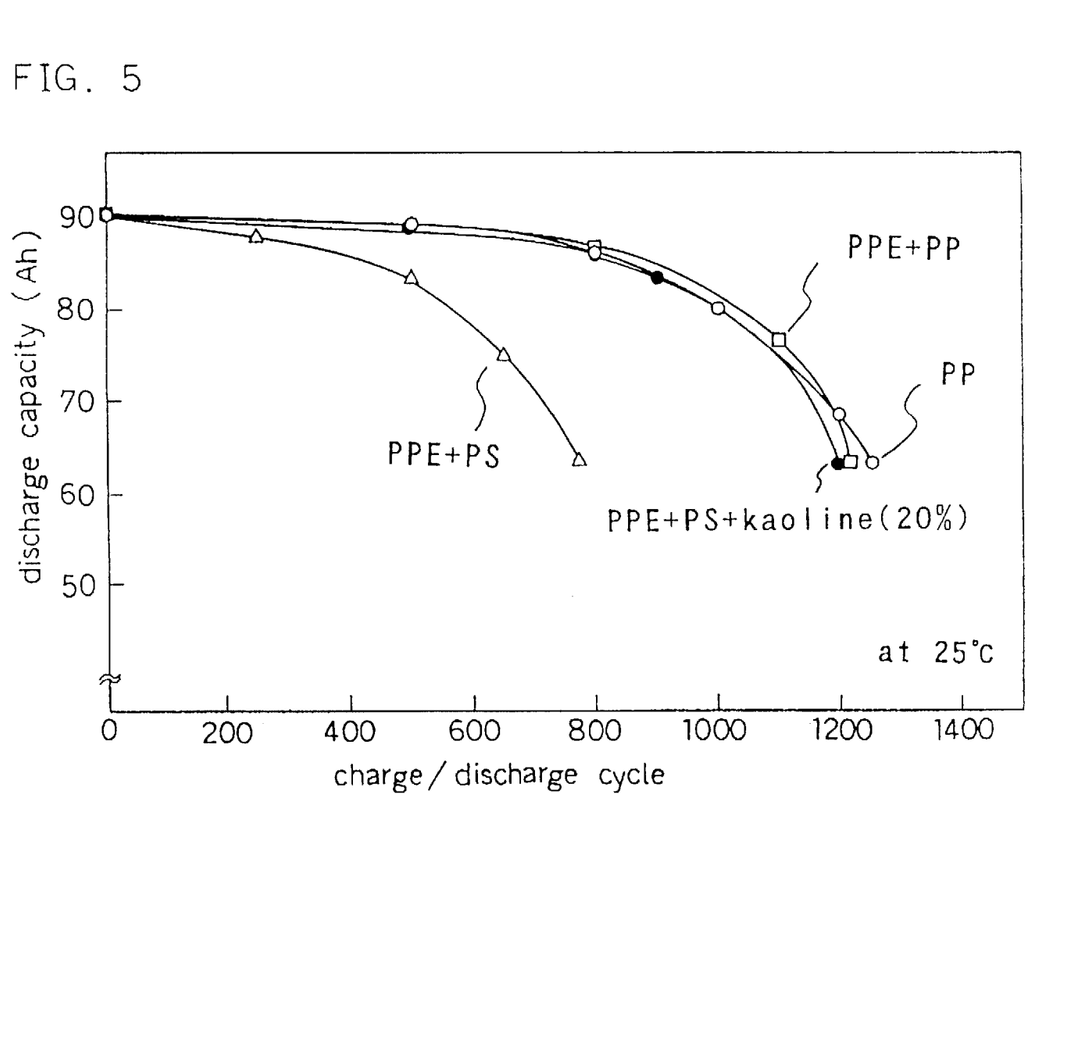
FIG. 5 is a characteristic graph illustrating a relation between charge/discharge cycles and a discharge capacity of the module battery at 25° C. in accordance with the present invention.
Figure 6:
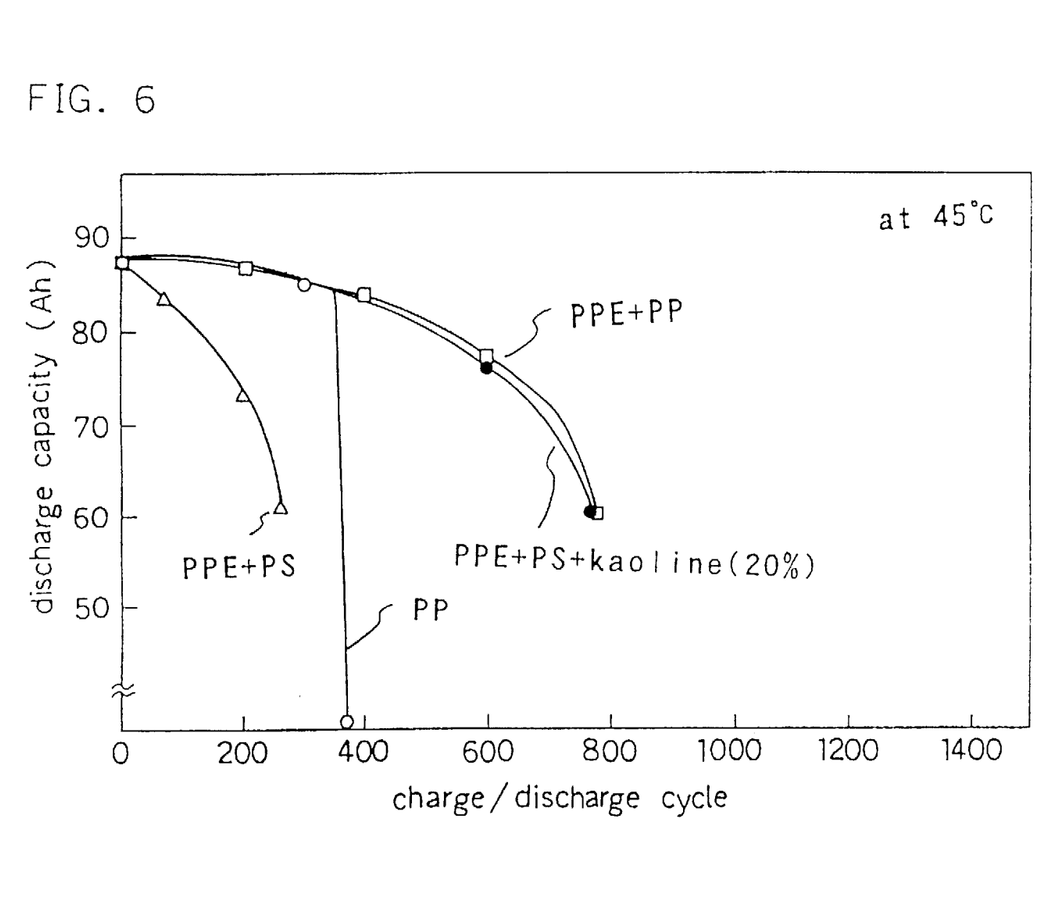
FIG. 6 is a characteristic graph illustrating a relation between charge/discharge cycles and a discharge capacity of the module battery at 45° C. in accordance with the present invention.
Figure 7:
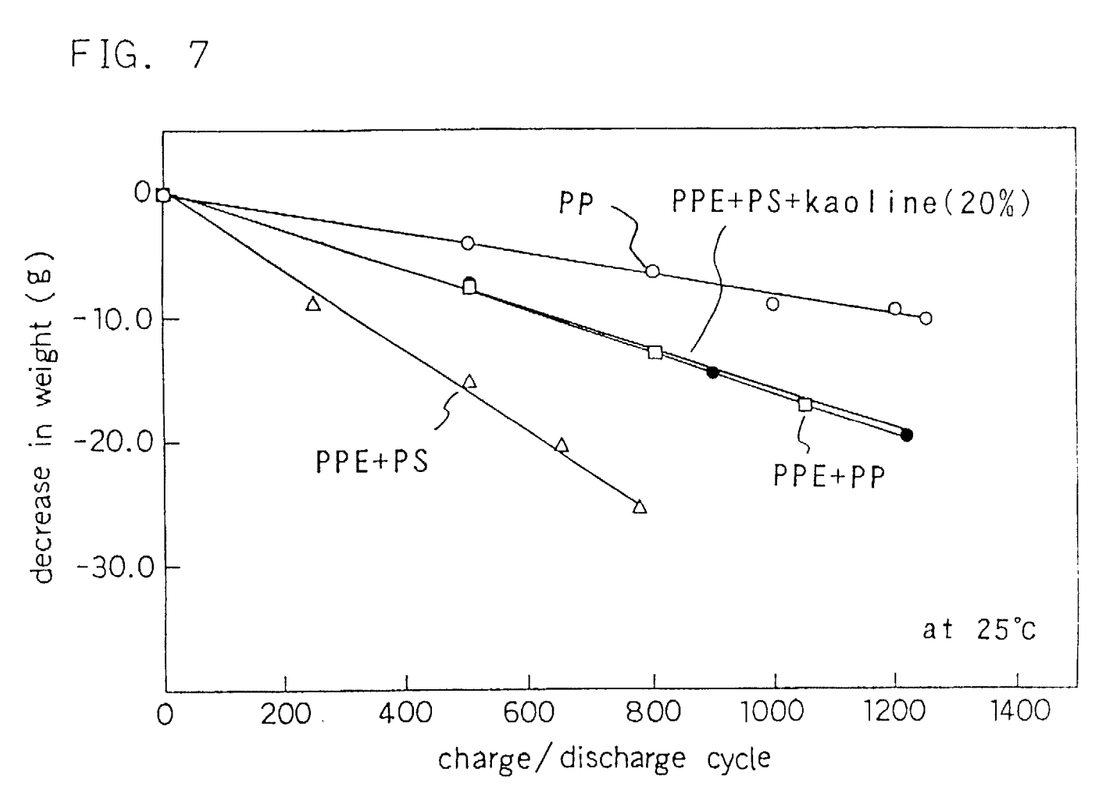
FIG. 7 is a characteristic graph illustrating a relation between charge/discharge cycles and a decrease in weight of the module battery at 25° C. in accordance with the present invention.
Figure 8:
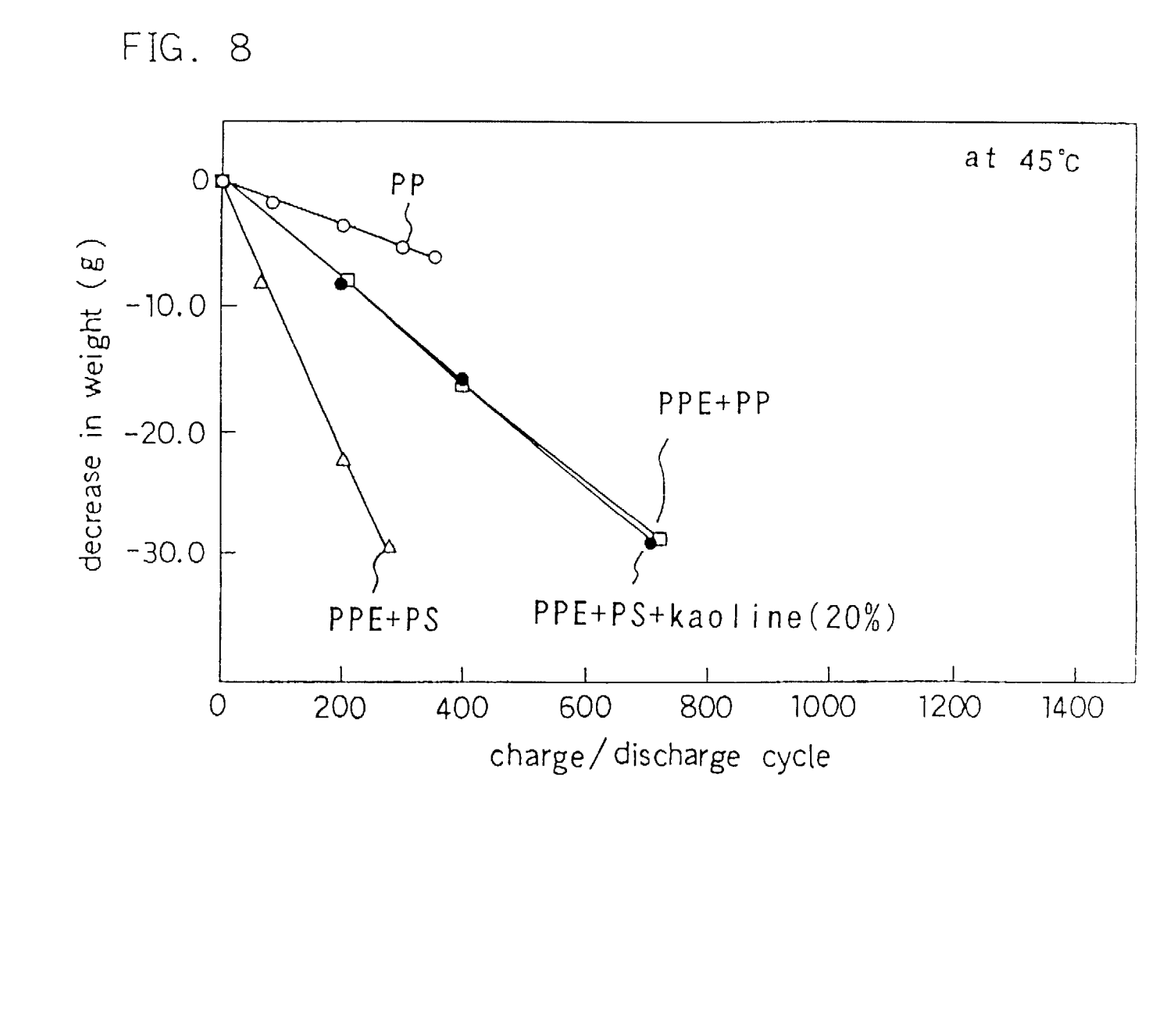
FIG. 8 is a characteristic graph illustrating a relation between charge/discharge cycles and a decrease in weight of the module battery at 45° C. in accordance with the present invention.

A life test was conducted on the cell 4. The life test was conducted by charging at a current of 20 A until the capacity reached 105% of the standard capacity or until the inner pressure reached 0.15 MPa, and discharging at a current of 50 A until the discharge capacity dropped to 60% of the standard capacity. After repetition of this charge/discharge cycle, the life test was discontinued when the discharge capacity dropped to 60% of the standard capacity. Changes in the discharge capacity during the charge/discharge cycles at 25° C. and 45° C. are shown in FIG. 5 and FIG. 6. At the same time, a weight of the cell 4 was measured. Changes in weight of the cell are shown in FIG. 7 and FIG. 8.

The battery which has the container made of the polymer alloy of PPE and PS has an excellent characteristic at 25° C., but has a shorter life at 45° C. This may be because an amount of moisture which passes through the container and scatters outside increases as the temperature rises. Contrary to this, the use of the container made of the composite material of the same polymer alloy containing 20 wt % scaly kaoline (No. 4) realized a less decrease in weight at 45° C. Therefore, an excellent life characteristic at high temperatures was obtained as shown in FIG. 8.

The cell including a container made of PP (No. 1) shows the most excellent characteristic in the life test at 25° C., but it became impossible to continue charge and discharge in the life test at 45° C. because a breakage occurred in the battery case 1. As in the battery case 1 made of PP which caused a breakage within 400 hours at 80° C. due to vapor pressure as described before, the battery case 1 was broken because of creep deformation and mechanical fatigue on charge/discharge cycle.

Figure 10:
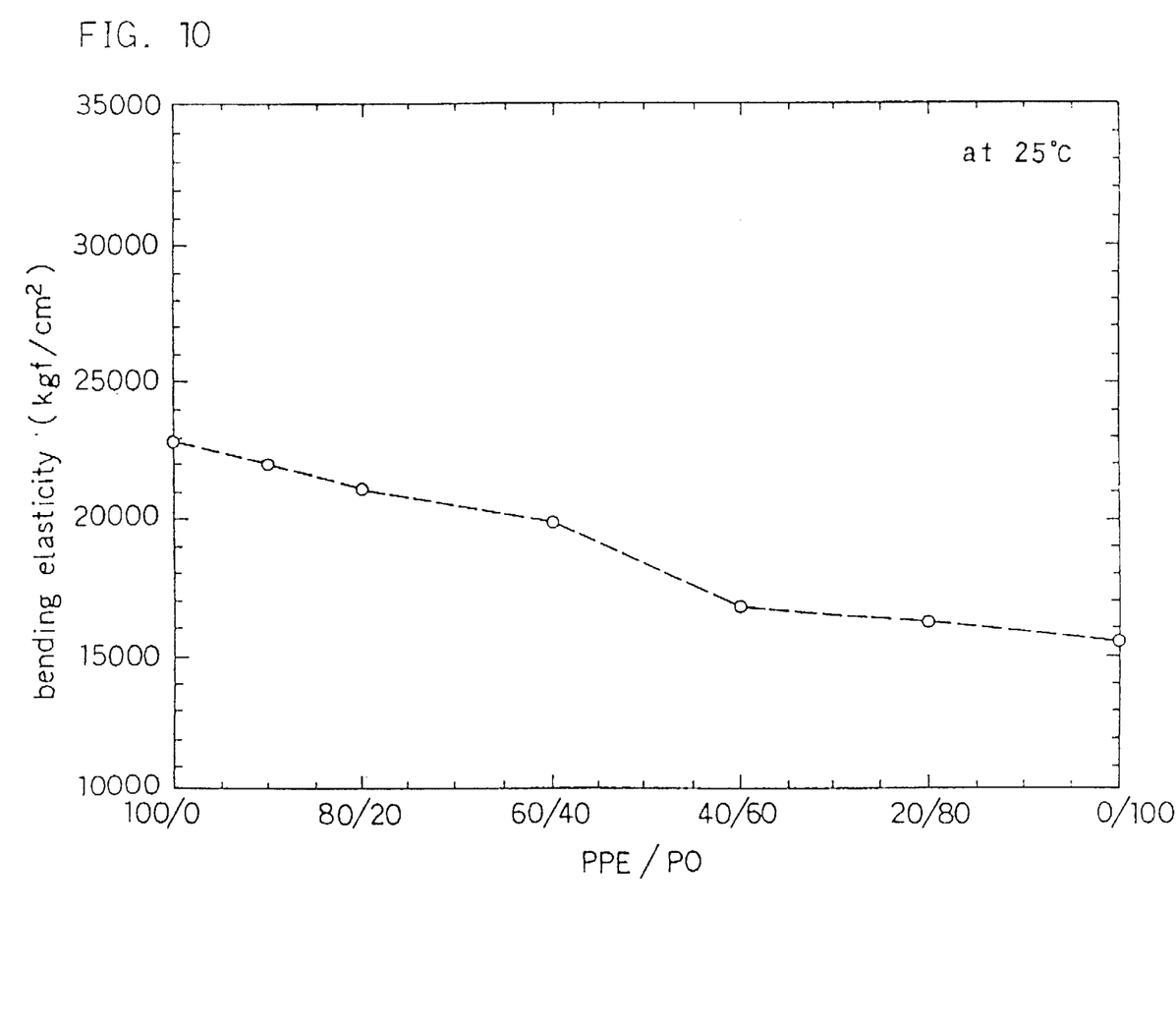
FIG. 10 is a characteristic graph illustrating a relation between a ratio of polyphenylene ether in the polymer alloy and bending elasticity of the polymer alloy at 25° C.

On the other hand, deterioration in characteristics of the cell including the container made of the PPE plus PP polymer alloy (No. 2) is greater than that of the cell including the container made of PP (No. 1) at 25° C. and 45° C., but the former has a longer life. However, if the content of PPE in the polymer alloy is less than 20 wt %, mechanical strength of the material is lowered and readily causes creep deformation as shown in FIG. 10, due to original characteristic of PP. On the other hand, if the content is more than 60 wt %, it is not possible to obtain an effective improvement in life due to increased moisture permeability as shown in FIG. 10. This is because preferably a low moisture permeability of not more than $5 \times 10^{-11}$ g·cm/cm²·sec·cmHg is desired in order to obtain an excellent property of the battery. Furthermore, if the content is more than 80 wt %, flowability becomes worse and moldability in injection molding is greatly lowered. The same tendency appears in the case that the other olefin resins are used instead of PP.

EXAMPLE 3

(Influence on Mechanical Strength)

Hereafter, demanded mechanical strength of the battery case introduced by strength test is explained.

Using the materials No. 1–4 mentioned below as a container, the sealed nickel-metal hydride storage batteries were assembled.

1. PP
2. a polymer alloy obtained by blending PPE and PP in a weight ratio of 40:60, and further adding a preferred amount of a compatibilizer
3. a polymer alloy obtained by blending PPE and PS in a weight ratio of 40:60
4. a composite material of the above polymer alloy (No. 3) and a scaly kaoline in a ratio of 3 wt % to the polymer alloy The obtained batteries were charged at a current of 10 A for 1 hour.

As a high temperature strength test, the batteries were preserved at 80° C. The fully charged batteries were preserved at 80° C. and a time period until a breakage of the container occurs due to the inner pressure thereof was measured. The inner pressure of the battery in a fully charged state is about 2 kgf/cm² at 80° C.

In general, when a nickel-metal hydride storage battery is preserved at a high temperature, metal elements contained in a hydrogen storage alloy in the negative electrode are dissolved in an electrolyte. This decreases a voltage of the battery gradually. When the terminal voltage is lowered to about 0 V, a short circuit occurs and it becomes impossible to use the battery again. The period until the occurrence of short circuit is taken as the life of the cell at high temperatures.

The time period until the container reached a breakage during the preservation and the terminal voltage at the time the breakage occurred are shown in Table 3.

TABLE 3

| resin | content of kaoline | period of time until breakage happened | voltage of battery (V) |
|---|---|---|---|
| PP | — | within 200 hours | 0.72 V |
| polymer alloy of PPE and PP | — | within 1,200 hours | 0.05 V |
| polymer alloy of PPE and PS | — | no breakage happened for 5,000 hours | 0.0 V |
|  | 20 wt % | no breakage happened for 5,000 hours | 0.0 V |
|  | 60 wt % | no breakage happened for 5,000 hours | 0.0 V |

As shown in Table 3, the cell containing the container made of PP was broken within 200 hours by creep deformation. The voltage of the battery when the breakage occurred was 0.72 V. This shows that the battery was broken although it could still function as a battery.

On the other hand, although the cell including the container made of the polymer alloy of PPE and PP was broken after 1,200 hours due to creep deformation, the voltage of the battery was lowered to 0.05 V at that time point. This indicates that when the battery was broken, the short circuit had already occurred between the positive electrode and the negative electrode, and the battery had already lost a function as a battery. Therefore, it is considered that the characteristic of the container meets the demanded characteristic as a container of a battery for an electric vehicle in view of mechanical strength.

The cell having the container made of the composite material of the PPE plus PS polymer alloy containing 20 wt % scaly kaoline as an additive was free from a breakage still after 5,000 hours of preservation, and the voltage had been lowered to completely 0 V by this time point. Therefore, it is certain that addition of the scaly kaoline improves the long-term reliability of the battery.

Next, as a strength test as a container of a battery for an electric vehicle, 10 sets of the above module batteries, including 50 cells, were practically loaded on the electric vehicle and were subjected to a road-going test. The road-going test was performed under conditions of a running of 100 km per day for 1 month, amounting to a distance of 3,000 km in total, and the occurrence of a breakage due to vibration during the road-going test was evaluated for each kind of batteries. The results are shown in Table 4.

TABLE 4

| resin | content of kaoline | rate of occurrence of breakage |
|---|---|---|
| PP | — | 0/50 |
| polymer alloy of PPE and PP | — | 0/50 |
| polymer alloy of PPE and PS | — | 0/50 |
|  | 20 wt % | 0/50 |
|  | 60 wt % | 6/50 |

As shown in Table 4, there was no breakage in the battery containing the container made of PP, or the polymer alloy of PPE and PP, but the occurrence of a breakage was about 12%, which was high, in the battery having the container made of the composite material of the polymer alloy of PPE and PP, and 60 wt % scaly kaoline. Mechanical characteristics of these materials are shown in Table 5, and thermal characteristics thereof are shown in Table 6.

TABLE 5

| resin | content of kaoline | bending elasticity [kgf/cm²] | bending strength [kgf/cm²] | tensile strength [kgf/cm²] | Izod impact value [kgf · cm/cm] |
|---|---|---|---|---|---|
| PP | — | 15,500 | 450 | 280 | 9.5 |
| polymer alloy of PPE and PP | — | 16,700 | 550 | 400 | 17 |
| polymer alloy of PPE and PS | — | 22,700 | 690 | 470 | 21 |
|  | 20 wt% | 28,000 | 800 | 500 | 15 |
|  | 60 wt% | 37,500 | 890 | 750 | 5.0 |

Bending elasticity and bending strength were measured according to ASTM-D790 (at 23° C., 50 RH%).

Tensile strength was measured according to ASTM-D638 (at 23° C., 50 RH%).

Izod impact value was measured according to ASTM-D256 (at 23° C., with notch).

TABLE 6

| resin | content of kaoline | deformation temperature [°C.] |
| --- | --- | --- |
| PP | — | 67 |
| polymer alloy of PPE and PP | — | 99 |
| polymer alloy of PPE and PS | — | 115 |
| | 20 wt % | 115 |
| | 60 wt % | 115 |

Deformation temperature was measured according to ASTM-D648 (18.6 kgf/cm$^2$).

According to the characteristics in Table 5 and Table 6, it is considered that the breakage occurred due to creep deformation at 80° C. in the cell containing the container made of PP only, since it has low mechanical strength and low deformation temperature.

On the other hand, the composite material containing the polymer alloy mainly comprised of PPE and PS, and 60 wt % scaly kaoline shows excellent characteristics in bending elasticity, bending strength and tensile strength, but shows a low Izod impact value. Therefore, the composite material is improper for use in the electric vehicle, since it has a high possibility that a breakage occurs during the practical use when the battery is loaded on the electric vehicle.

Figure 9:
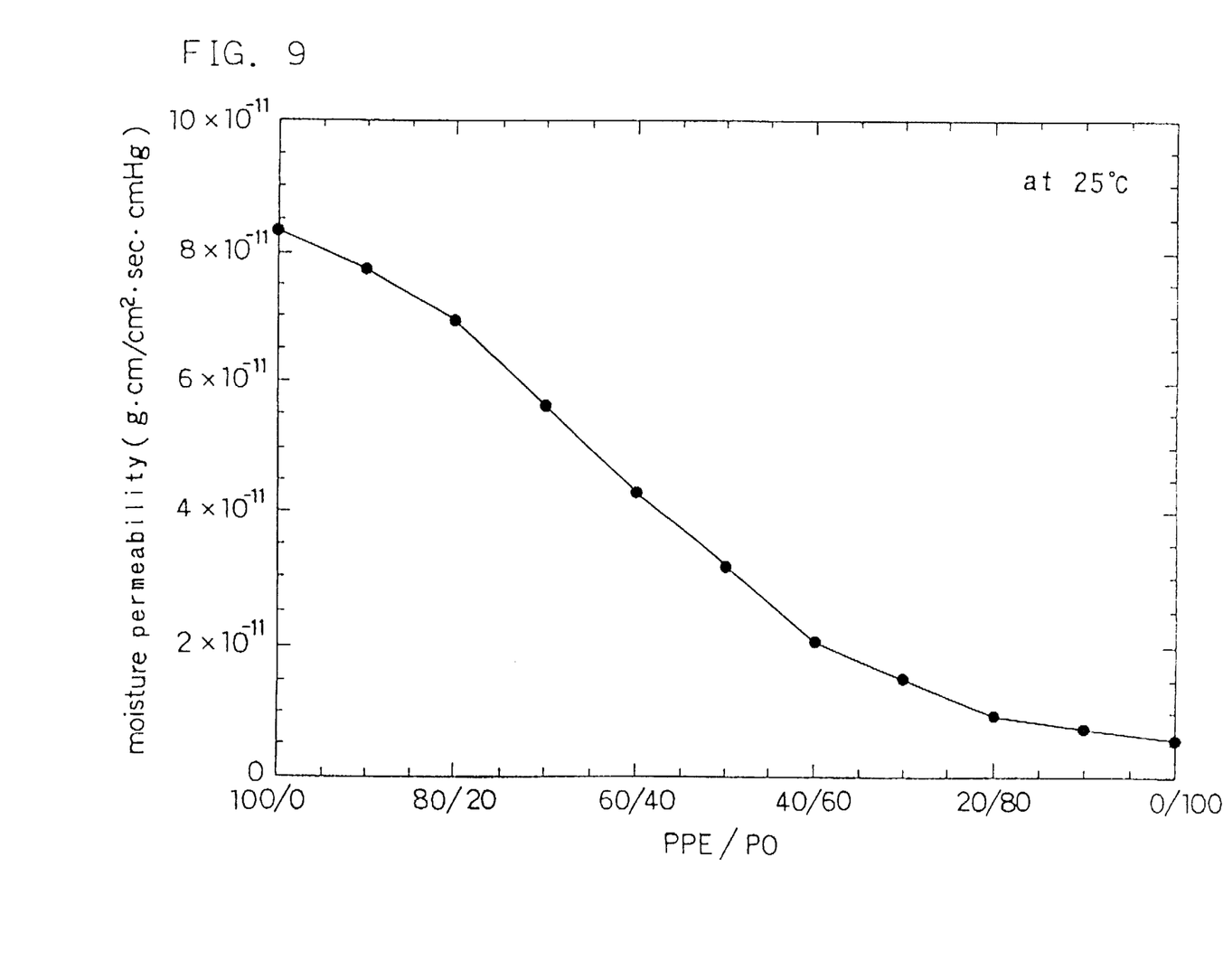
FIG. 9 is a characteristic graph illustrating a relation between a ratio of polyphenylene ether in a polymer alloy of polyphenylene ether and polystyrene, and moisture permeability of the polymer alloy at 25° C.

A synthetic resin has a tendency that higher bending elasticity provides a lower Izod impact value. Therefore, it is preferable that the bending elasticity is 16,000–30,000 kgf/cm$^2$. Especially, it is preferable that the bending elasticity measured according to ASTM-D790 (23° C., 50 RH%) is not less than 16,000 kgf/cm$^2$, and deformation temperature measured according to ASTM-D648 is not less than 80° C., in order to prevent creep deformation of the battery containing a container having a thickness of 2–3 mm for not less than 1,000 hours at 80° C. at an inner pressure of the battery of 8 kgf/cm$^2$. To meet the requirement, it is preferable to apply a polymer alloy mainly comprised of PPE and the olefin resin containing 20–60 wt % PPE, as shown in FIG. 9 and FIG. 10. In the case of a composite material of a polymer alloy of PPE and an inorganic powder, it is preferable to contain the inorganic powder by 5–50 wt %.

Other inorganic powders such as alumina, titania or silica can be used instead of the scaly kaoline dispersed in the polymer alloy.

As described above, according to the present invention, it is possible to restrict the amount of moisture escaping from the electrolyte toward outside, thereby elongating the life and preventing a breakage of the battery due to creep deformation or mechanical fatigue under outdoors at high temperatures.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A sealed alkaline storage battery comprising:

an electrode group comprising positive electrodes and negative electrodes which are piled alternately and separators sandwiched therebetween;

a battery case containing said electrode group therein; and a lid for sealing an opening portion of said battery case, wherein said battery case or said lid is made of a polymer alloy containing polyphenylene ether and an olefin resin as main components, said olefin resin occupying 20–60 wt % of the whole polymer alloy.

2. The sealed alkaline storage battery in accordance with claim 1, wherein said olefin resin is polypropylene.

3. The sealed alkaline storage battery in accordance with claim 1, wherein said polymer alloy has a moisture permeability of not more than 5×10$^{-11}$ g·cm/cm$^2$·sec·cmHg.

4. The sealed alkaline storage battery in accordance with claim 1, wherein said polymer alloy has a deformation temperature of not less than 80° C.

5. The sealed alkaline storage battery in accordance with claim 1, wherein said polymer alloy has a bending elasticity of 16,000–30,000 kgf/cm$^2$, a bending strength of not less than 500 kgf/cm$^2$, and a tensile strength of not less than 300 kgf/cm$^2$.

6. A sealed alkaline storage battery comprising:

an electrode group comprising positive electrodes and negative electrodes which are piled alternately and separators sandwiched therebetween;

a battery case containing said electrode group therein; and a lid for sealing an opening portion of said battery case, wherein said battery case or said lid is made of a composite material of polymer alloy comprising polyphenylene ether, and scaly kaoline dispersed in said polymer alloy.

7. The sealed alkaline storage battery in accordance with claim 6, wherein said composite material contains said scaly kaolione in 5–50 wt % of said polymer alloy.

8. The sealed alkaline storage battery in accordance with claim 6, wherein said polymer alloy contains said polyphenylene ether in 20–80 wt % of said polymer alloy.

9. The sealed alkaline storage battery in accordance with claim 6, wherein said polymer alloy has a moisture permeability of not more than 5×10$^{-11}$ g·cm/cm$^2$·sec·cmHg.

10. The sealed alkaline storage battery in accordance with claim 6, wherein said polymer alloy has a deformation temperature of not less than 80° C.

11. The sealed alkaline storage battery in accordance with claim 6, wherein said polymer alloy has a bending elasticity of 16,000–30,000 kgf/cm$^2$, a bending strength of not less than 500 kgf/cm$^2$, and a tensile strength of not less than 300 kgf/cm$^2$.

* * * * *